United States Patent [19]

Arafat

[11] Patent Number: 4,659,409

[45] Date of Patent: Apr. 21, 1987

[54] METHOD AND MEANS FOR PREPARING FLOOR COVERING USING A TEMPLATE

[76] Inventor: Hafiz Arafat, 7231 Rue Godbout, Rancho Palos Verde, Calif. 90274

[21] Appl. No.: 773,025

[22] Filed: Sep. 6, 1985

[51] Int. Cl.[4] ........................ B32B 31/10; B32B 31/18

[52] U.S. Cl. ........................................ 156/249; 33/12; 33/527; 156/63; 428/195; 428/343; 428/542.2; 428/542.8; 434/75; 434/79

[58] Field of Search .................... 33/12, 527; 428/195, 428/343, 542.2, 542.8; 434/75, 79, 80; 156/60, 63, 247–249

[56] References Cited

U.S. PATENT DOCUMENTS 4,250,642 2/1981 Rieale .............................. 434/80 X 4,311,464 1/1982 Messina ............................ 434/79 X

*Primary Examiner*—Robert A. Dawson

*Attorney, Agent, or Firm*—Harlan P. Huebner

[57] ABSTRACT

A template of translucent material is employed to simulate on a reduced scale the over-lay material to be applied to a floor area as it is illustrated by a drawing on the same scale as the template. The template is supplied in roll form or sheet material and is of a width proportionate on the aforesaid scale, to the width of the over-lay material to be applied to the floor. In order to realize all of the advantages of the invention, this template also carries indicia indicative of the subdivisions of the scale to which it is made and orientation indicia which may conveniently be so spaced as to serve as scaling indicia as well. The under side of the template carries an adhesive of the type known as a repositioning adhesive by means of which the template may be removably adhered to the drawing of the floor area and repositioned thereon at will.

8 Claims, 9 Drawing Figures

METHOD AND MEANS FOR PREPARING FLOOR COVERING USING A TEMPLATE

BACKGROUND OF THE INVENTION

1. Field of the Invention

The present invention relates to a method of preparing sections of floor covering materials for application to floor areas and to a novel template for use in connection therewith.

2. Description of the Prior Art

Floor covering materials, such as carpeting, linoleum, etc., ordinarily are supplied in rolls of standard widths. In the application of such materials to floors, sections cut from such rolls are joined in edge-to-edge relationship to cover a floor area which may be irregular in outline.

Because carpeting material has a perceptible grain and many other floor coverings are patterned, it is desirable that all sections to be joined in this manner be aligned as to grain or pattern in the same direction. In order to achieve such a result, the cutter who is preparing the required sections from a roll at a location remote from the floor area to be covered must take into consideration not only the shape and dimensions of each section, but also its orientation relative to the other sections in the completed floor covering. This has not heretofore been achievable because information as to such orientation has not been available to such cutters.

It is a primary object of the present invention to provide a method and means whereby proper alignment of such floor covering may be achieved where sections are cut from a standard roll at a location remote from the floor to be covered.

SUMMARY OF THE INVENTION

According to the present invention, a template of translucent material is employed to simulate on a reduced scale the over-lay material to be applied to a floor area as it is illustrated by a drawing on the same scale as the template. The template is supplied in roll form and is of a width proportionate on the aforesaid scale, to the width of the over-lay material to be applied to the floor. In order to realize all of the advantages of the invention, this template also carries indicia indicative of the subdivisions of the scale to which it is made and orientation indicia which may conveniently be so spaced as to serve as scaling indicia as well.

The underside of the template carries an adhesive of the type known as a repositioning adhesive by means of which the template may be removably adhered to the drawing of the floor area and repositioned thereon at will.

A length of the template is first removably adhered to the surface of the floor area drawing which can be viewed through the translucent material of the template; the initial positioning of the template being such as to cause it to cover as much as possible of the floor area shown in the drawing. The portion of the template overlying the floor area of the drawing is then cut away from the rest of the translucent material of the template.

Any uncovered portions of the floor area depicted in the drawing are then covered by removably adhering to them additional unused portions of the template cut to fit the uncovered portions of the floor area, taking especial care to align the orientation indicia on all of the applied portions of the template with each other.

When all parts of the floor area of the drawing have been covered in this manner, all of the portions of the template adhered within the floor area of the drawing are removed and may be removably adhered to a separate sheet for filing pending use.

When it is desired to prepare over-lay material for the floor area depicted in the drawing, full-scale pieces of such material are cut from a standard roll to the dimensions shown by the scale indicia of the corresponding template portions, taking care to so orient them as to their grain or pattern in the manner indicated by the orientation indicia of the template portions.

Finally, the pieces of over-lay material are fitted together on the floor area to be covered, all properly oriented as to grain or pattern, and seaming or cementing is effected to connect them in the manner well known in the art.

DETAILED DESCRIPTION OF THE INVENTION

Figure 1:
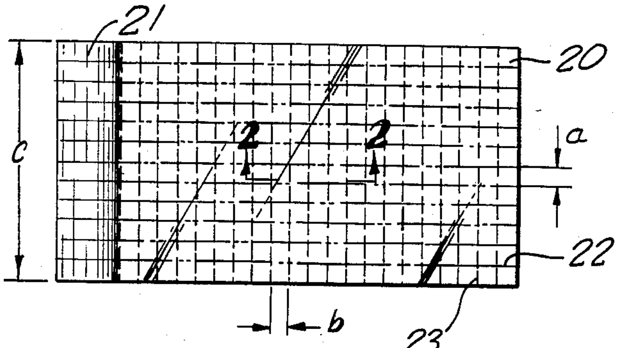
FIG. 1 is a view in plan of a roll of the template of the present invention partially unrolled on a flat surface to show the indicia carried thereby.

For the purpose of carrying out the method of the present invention, a sheet of transparent or translucent template material 20 is provided, preferably in the form of a roll 21. The sheet 20 is marked with scaling indicia 22 transversely thereof and scaling indicia 23 longitudinally thereof; the significance of which is dependent upon the scale of the drawing 25 in conjunction with which the template material 20 is to be employed.

In the example shown in the accompanying drawing, the drawing 25 is drawn on the scale of one quarter inch to the foot, so the transverse indicia 22 are spaced one quarter inch apart as indicated at "a", and the longitudinal indicia 23 are likely spaced one quarter inch apart as indicated at "b". Also, because in the example here chosen for illustrative purposes the floor covering material happens to be supplied in rolls 12 feet in width, the width of the strip of translucent material 20 is made 3 inches in width, representing 12 feet at the quarter inch to the foot scale, as indicated at "c".

The sheet 20 also carries orientation indicia which, while they may be separate from the scaling indicia, are most conveniently combined with them as by making the scaling indicia 22 of one color and the scaling indicia 23 of a different color, or by forming arrow heads at quarter inch intervals on either scaling indicium.

Figure 2:
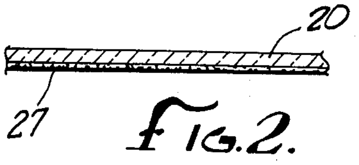
FIG. 2 is a detail view in section taken on the line 2—2 of FIG. 1.
Figure 3:
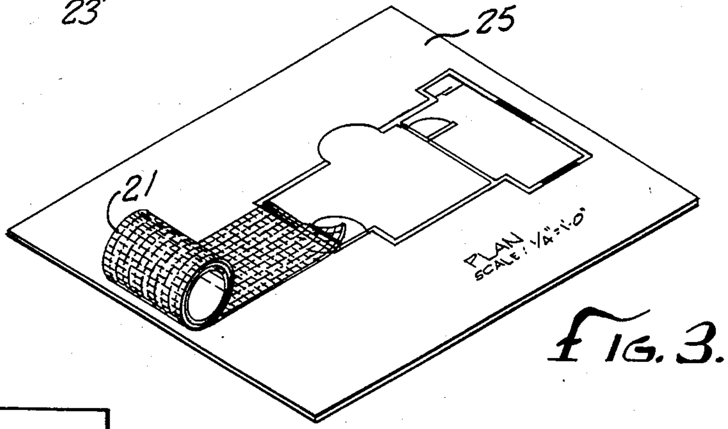
FIG. 3 is a view in perspective of a scaled drawing of a floor area to be covered having an identically scaled roll to template material laid thereon in preparation for carrying out the method of the present invention.
Figure 9:
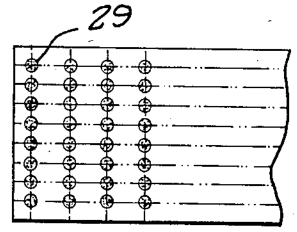
FIG. 9 is a view in plan of the underside of a section of another form of the template material of the present invention showing an alternative application of the repositioning adhesive thereon.
Figure 7:
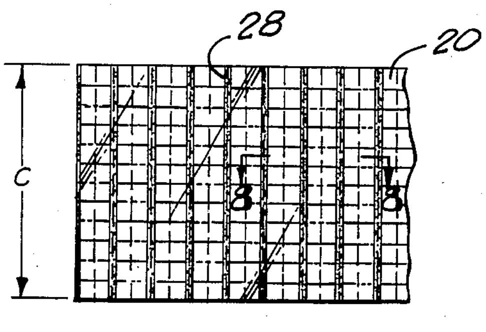
FIG. 7 is a view in plan of the underside of a section of the template material of the present invention illustrating the strip application of repositioning adhesive thereon.
Figure 8:
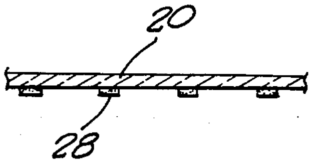
FIG. 8 is a detail view in section taken on the line 8—8 of FIG. 7.

Applied to the under-side of the translucent sheet 20 is an adhesive of the type known as a repositioning adhesive which is one of the type conventionally employed to temporarily adhere a sheet, such as the sheet 20, to another surface while permitting it to be easily removed therefrom and repositioned on the same or another surface. This adhesive is applied in longitudinal strips 27 spaced from each other on the under-side of the sheet 20, as shown in FIG. 2; in transverse strips 28 spaced from each other, as shown in FIGS. 7 and 8; or in small dots 29 preferably at the intersection of the scale indicia 22 and 23, as shown in FIG. 9.

Figure 4:
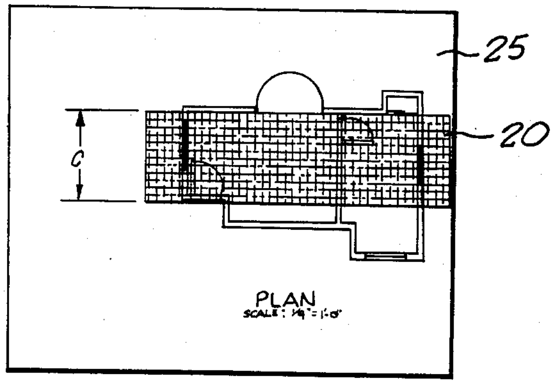
FIG. 4 is a view in plan of the drawing of FIG. 3 showing the manner of application of the template material thereto in the initial step of the present method.

Applying the method of the present invention, a strip of the translucent template material 20, preferably sufficient in area to cover as much as possible of the floor area shown in the drawing 25, is first removably adhered to the surface of the drawing 25 overlying the drawn floor area, as shown in FIG. 4. Next, the sheet 20 is cut along the lines 31, 32 and 33 into two pieces 35 and 36 so that all of the sheet 20 then left adhering to the drawing 25 lies within the bounds of the floor area depicted by the drawing 25. The portions of the floor area left uncovered at this point then are covered by temporarily adhering to the drawing pieces from an additional portion of the sheet 20 cut to the size and shape of the uncovered areas, as indicated at 37, 38, 39, and 40; the area of the drawing indicated at 40 preferably being covered by three pieces cut from the sheet 20 and designated 40*a*, 40*b*, and 40*c*, respectively, in FIG. 5.

Figure 5:
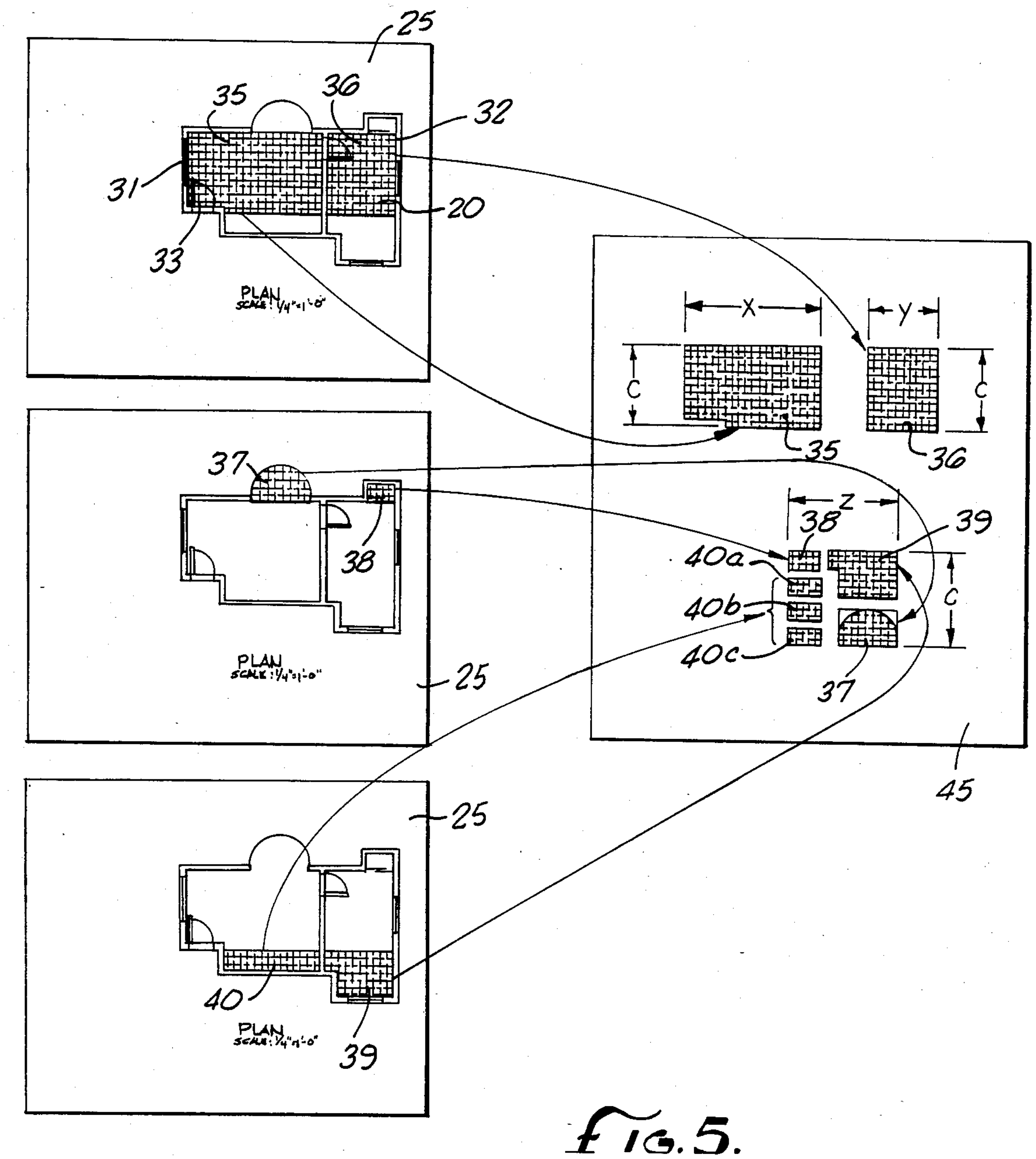
FIG. 5 is a diagrammatic view in plan showing the sequential steps in carrying out the method of the present invention as described in detail hereinafter.
Figure 6:
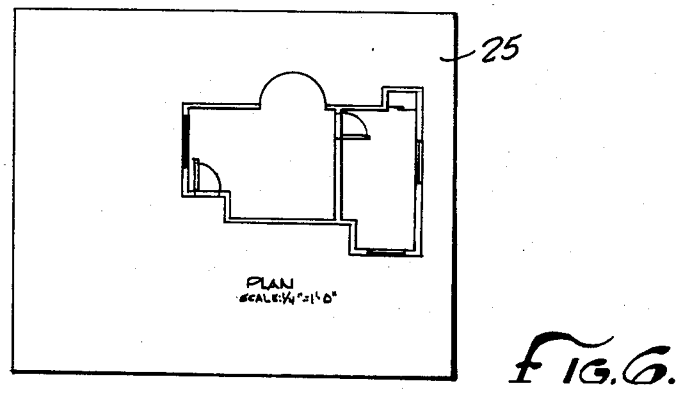
FIG. 6 is a view in plan of the drawing of FIG. 3.

When the entire floor area depicted by the drawing 25 has been covered in this manner, the eight pieces cut from the template material 20 for that purpose may be temporarily adhered to a file sheet 45, as shown in the right-hand portion of the diagrammatic views of FIG. 5. It will be appreciated that only a minimum length of the template material 20 of width "c", that is, a length equal to the sum of dimensions "x", "y", and "z" need be utilized in carrying out the method of the present invention in this manner. It is also desirable that in transferring the eight cut pieces to the sheet 45, all of the pieces be oriented with their orientation indicia aligned or in parallel with each other.

When it is desired to complete the application of the over-lay material to the floor area depicted in the drawing 25, full-scale pieces of the carpet or other over-lay material are prepared, each corresponding in shape to one of the pieces of the template material removably adhered to the sheet 25, taking care that the orientation of each of said pieces conforms with the orientation indicia of the corresponding template pieces. Whenever a piece of the over-lay material is rectangular, as in the case of the pieces cut to correspond with template pieces 35, 36, 38, 40*a*, 40*b* and 40*c*, so that they could fit into the assembly of pieces in more than one orientation, it is desirable to mark the underside of each piece of the cut over-lay material with orientation indicia corresponding to that of the template piece to which it corresponds.

Finally, the pieces of the over-lay material so oriented are fitted together on the floor area and their connection to each other in that area is accomplished in any of the manners well known in the art.

While the present invention has herein been shown and described in what is believed to be the most practical and preferred embodiment, it is recognized that departures may be made therefrom within the scope of the invention which is not to be limited to the details disclosed herein, but is to be accorded the full scope of the claims so as to embrace any and all equivalents, methods and means.

I claim:

1. A method of dividing over-lay material supplied in rolls of a given width into joinable grain or design matching pieces to cover an irregularly shaped floor area including the steps of providing a translucent template of a width scaled in correspondence with said given material width and carrying orientation indicia aligned or parallel representing said scale, removably adhering said template to a correspondingly scaled drawing of said floor area, cutting said template into separate aligned or parallel portions within the floor area of said drawing from the rest of the template, removing said portions of said template and adheringly repositioning the same on another surface in said aligned or parallel positions to render an overall scaled length to fix the total length of the over-lay material when converted from said scale and to preserve said requirement, preparing said full scale length of over-lay material from said portions of template, and cutting full-scale pieces of said over-lay material corresponding to each of said portions of said template.

2. A method according to claim 1 wherein said orientation indicia are vertical lines of one visual characteristic and horizontal lines crossing said vertical lines of another visual characteristic.

3. A method according to claim 2 wherein said one visual characteristic is a color and said other visual characteristic is another color.

4. A template for use in conjunction with a scaled drawing of a floor area to be covered with an over-lay material having a grain or design running the length of said material which is supplied in a given width in which said template is cut into portions for appropriate joining and installation over said floor area comprising a sheet of translucent material of a width scaled to the given width of said over-lay material and said drawing, said sheet carrying orientation indicia scaled to said drawing and said sheet adopted to be cut into pieces with the corresponding orientation indicia aligned or parallel for each piece to carry out the grain or design of said over-lay material along said length, said pieces include repositioning adhesive on one side thereof for removably affixing to said scaled drawing, yet removable to another surface for orientation and alignment to determine the overall scaled length of said over-lay material while maintaining the constant scaled width.

5. A template according to claim 4 wherein the orientation indicia are vertical lines of one visual characteristic and horizontal lines crossing said vertical lines of another visual characteristic.

6. A template according to claim 5 wherein said one visual characteristic is a color and said other visual characteristic is another color.

7. A template according to claim 5 wherein one of said lines is solid and said other lines are broken to assist in orientation of said pieces of template upon positioning on said scaled drawing and said another surface.

8. A template according to claim 4 in which said sheet is of a width proportionate to the width in which the over-lay material is supplied and said orientation indicia are scaled in correspondence with the scale of said drawing.

* * * * *